(12) United States Patent
Wang et al.

(10) Patent No.: US 8,171,317 B2
(45) Date of Patent: May 1, 2012

(54) CONSERVING POWER IN A PLATFORM SUPPORTING NETWORK INTERFACES

(75) Inventors: Ren Wang, Portland, OR (US);
Christian Maciocco, Portland, OR (US);
Tsung-Yuan C. Tai, Portland, OR (US)

(73) Assignee: Intel Corporation, Santa Clara, CA (US)

(*) Notice: Subject to any disclaimer, the term of this patent is extended or adjusted under 35 U.S.C. 154(b) by 442 days.

(21) Appl. No.: 12/414,370

(22) Filed: Mar. 30, 2009

(65) Prior Publication Data
US 2010/0250982 A1 Sep. 30, 2010

(51) Int. Cl.
*G06F 1/32* (2006.01)
(52) U.S. Cl. .................... 713/320; 370/311
(58) Field of Classification Search ............ 713/320; 710/30; 709/236; 370/311
See application file for complete search history.

(56) References Cited

U.S. PATENT DOCUMENTS

| | | | |
|---|---|---|---|
| 5,307,413 A * | 4/1994 | Denzer | 713/151 |
| 7,656,561 B2 * | 2/2010 | Molgaard et al. | 358/426.01 |
| 2005/0219076 A1 * | 10/2005 | Harris | 341/51 |

OTHER PUBLICATIONS

Extended European Search Report for European Patent Application No. 10158456.3-1247, Mailed Oct. 6, 2010, 10 pages.
Gan, Tong, et al., "Cross-layer optimization for multi-user video streaming over IEEE 802.11E HCCA wireless networks", Multimedia and Expo, 2008 IEEE International Conference, IEEE, Piscataway, NJ, Jun. 23, 2008, 4 pages.
Lan, Tse-Hua, et al., "Power Optimized Mode Selection for H.263 Video Coding and Wireless Communications", Image Processing, 1998. ICIP 98 Proceedings. 1998 International Conference on Chicago, IL, Oct. 4-7, 1998, Los Alamitos, CA, 6 pages.
Li, Keqiu, et al., "Energy Efficient Methods and Techniques for Mobile Computing", Semantics, Knowledge and Grid, Third International Conference, IEEE, Oct. 1, 2007, 6 pages.
Lu, Xiaoan, et al., "Power Efficient Multimedia Communication Over Wireless Channels", IEEE Journal on Selected Areas in Communications, IEEE Service Center, vol. 21, No. 10, Dec. 1, 2003, 14 pages.
Misra, Satyajayant, et al., "A survey of multimedia streaming in wireless sensor networks", IEEE Communications Surveys, IEEE, New York, NY, vol. 10, No. 4, Oct. 1, 2008, 22 pages.
First Non-Final Office Action for Chinese Patent Application No. 201010156166.4 Mailed Aug. 9, 2011, 18 Pages.
Non-Final Office Action for European Application No. 10158456.3 Mailed Jul. 22, 2011, 8 Pages.
Non-Final Office Action for Korean Patent Application No. 10-2010-27933, Mailed Aug. 10, 2011, 6 Pages.

* cited by examiner

*Primary Examiner* — Glenn A Auve
(74) *Attorney, Agent, or Firm* — Blakely, Sokoloff, Taylor & Zafman LLP

(57) ABSTRACT

A computer system may comprise a platform in which a processing block may be provisioned. The processing block may determine an optimal compression ratio such that the optimal compression ratio may cause a minimum of a total power to be consumed by the computer platform. The total power may comprise total compression power consumption and total transmission power consumption. The processing block may generate compressed frames from a plurality of frames generated by an application. The compressed frames may be generated by encoding the plurality of frames using the optimal compression ratio. The processing block may select a network interface from multiple network interfaces supported by the computer system to transmit the compressed frames.

25 Claims, 3 Drawing Sheets

| COMPRESSION RATIO (r) 301 | PROCESSING INVOLVED (PI) 302 | FRAME SIZE (FS) 303 | QUANTITY OF FRAMES 304 | COMPRESSION POWER CONSUMPTION /bit (CPC 305) | TRANSMISSION POWER CONSUMPTION/ bit (TPC 306) |
|---|---|---|---|---|---|
| LOW | LOW | LARGE | MORE | LOW | HIGH |
| HIGH | HIGH | SMALL | LESS | HIGH | LOW |

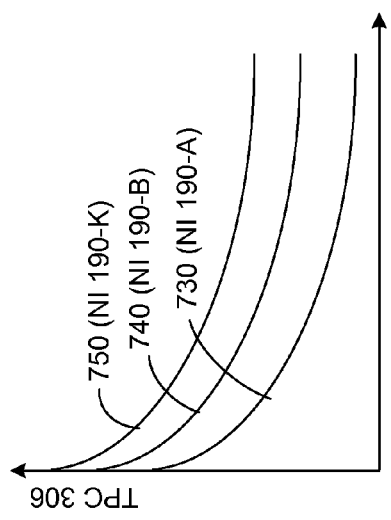
FIG. 5
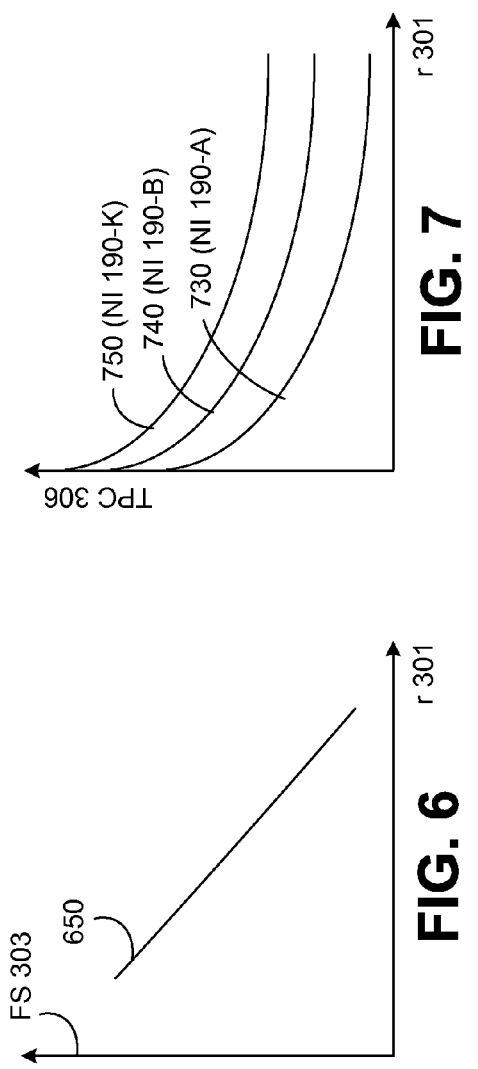
FIG. 6
FIG. 7
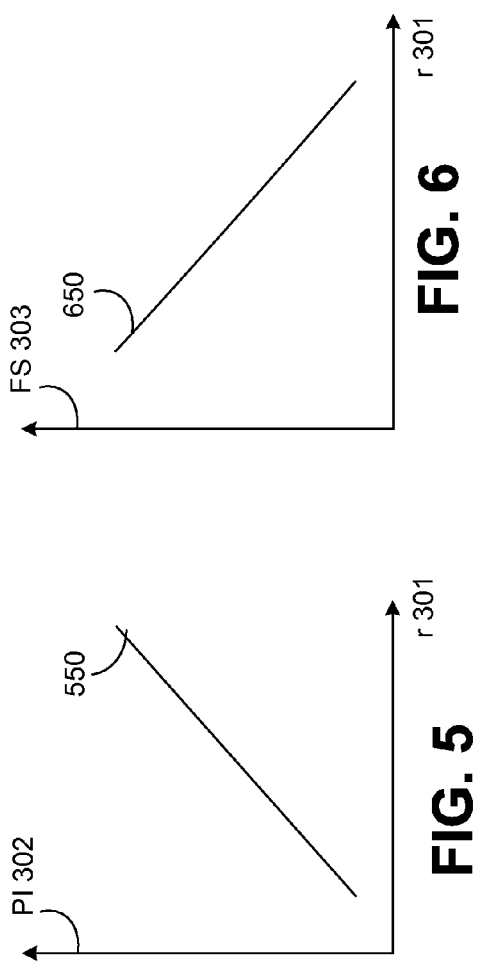
FIG. 8
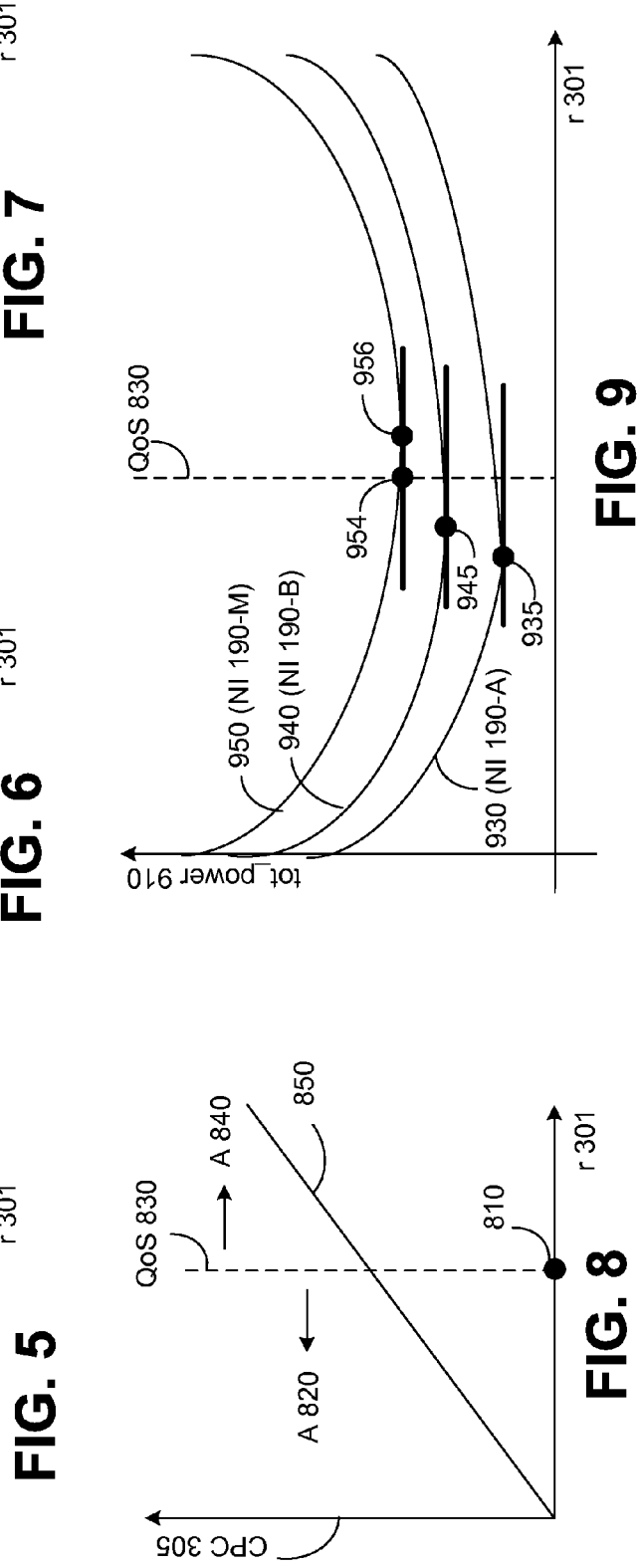
FIG. 9

CONSERVING POWER IN A PLATFORM SUPPORTING NETWORK INTERFACES

BACKGROUND

Advancements in semiconductor and communication technologies have enabled computer platforms to support usage models and applications such as network video streaming on resource constrained devices. Examples of such usage model may include streaming of video data on a wireless display, remote display or video conferencing for mobile platforms and such other usage models. Typically, the computer platform may process the data units before transmitting the processed data units to other devices. The computer platform components may, for example, compress the data units generated by the applications. The computer platform components may consume power while performing such processing. The computer platform may support one or more network interfaces such as Ethernet, Wi-Fi, Bluetooth®, WiMAX for transmitting and receiving data units and the network interfaces may consume power as well.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 5 is a graph 500, which depicts relation between compression ratio (r) and processing involved (PI) according to one embodiment.

FIG. 6 is a graph 600, which depicts relation between compression ratio (r) and the frame size (FS) according to one embodiment.

FIG. 7 is a graph 700, which depicts relation between compression ratio (r) and transmission power consumption (TPC) for one or more network interfaces (NI) according to one embodiment.

FIG. 8 is a graph 800, which depicts the relation between compression ratio (r) and the compression power consumption (CPC) according to one embodiment.

FIG. 9 is a graph 900, which depicts the relation between compression ratio (r) and the total power consumed by the computer system 100 that may be used to determine the optimal total power used according to one embodiment.

DETAILED DESCRIPTION

The following description describes embodiments of a technique to conserve power in a platform supporting network interface(s). In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
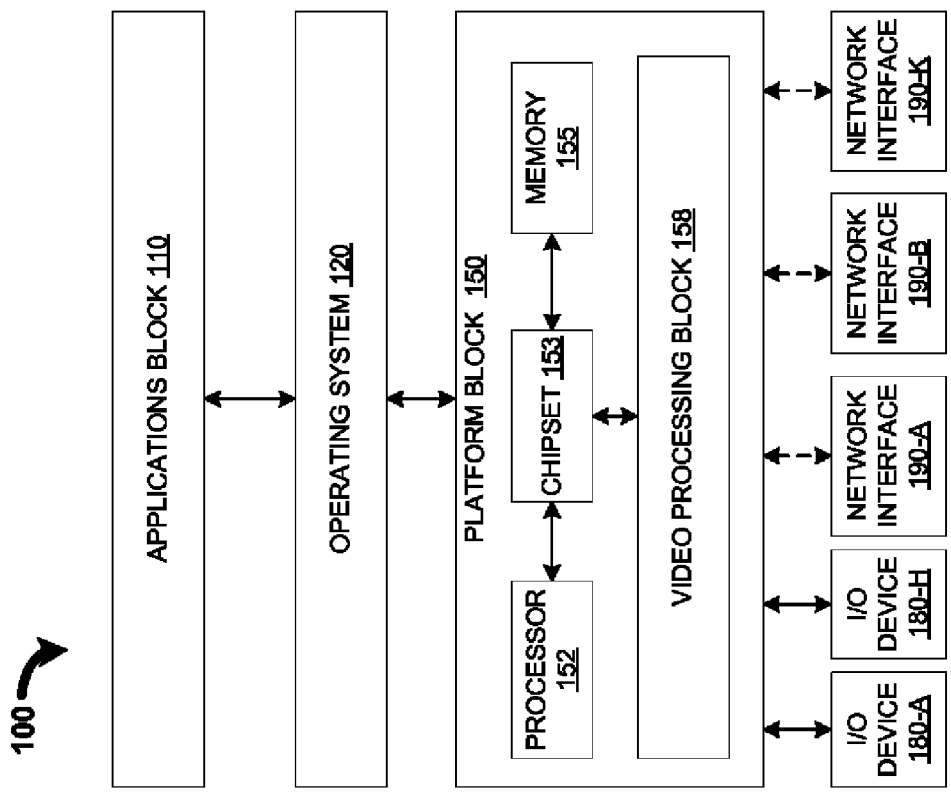
FIG. 1 illustrates a computer system 100 that may support techniques to conserve power according to one embodiment.

A computer system 100 supporting one or more network interfaces that may include techniques to conserve power in accordance with an embodiment, is illustrated in FIG. 1. In one embodiment, the computer system 100 may represent a resource constrained device, a mobile device, mobile internet device, and other such computer systems. In one embodiment, the computer system 100 may comprise an applications block 110, an operating system OS 120, a platform block 150, I/O devices 180-A to 180-H, and network interfaces 190-A to 190-K.

In one embodiment, the applications block 110 may support various audio, video, multi-media, networking, scientific, and such other applications. In one embodiment, the applications block 110 may support network video streaming applications such as a wireless display for mobile internet devices. In one embodiment, the applications block 110, which execute a network video streaming application may generate data units such as the video data units. In one embodiment, the network video streaming application may include video conferencing, video telephony, internet video, and such other applications. In one embodiment, the operating system OS 120 may manage and coordinate the execution of applications while sharing the resources available with the platform block 150.

In one embodiment, the network interfaces 190-A to 190-K may represent various wired and wireless network interfaces. In one embodiment, the network interfaces 190-A to 190-K may support Wi-Fi, WI-MAX, Bluetooth®, Ultra wide-band (UWB), 60 GhZ and such other interfaces. In one embodiment, the network interfaces 190 may consume power ('transmission power consumption/bit', hereafter) for transmitting bits that are received from the platform block 150. In one embodiment, the network interface 190-A may consume less transmitting power to transmit M frames compared to the network interface 190-K. In one embodiment, the network interface 190-A, which may support Wi-Fi technology may consume less power to transmit M frames compared to the network interface 190-K supporting Bluetooth® technology.

In one embodiment, the platform block 150 may comprise a processor 152, a chipset 153, a memory 155, and a video processing block 158. In one embodiment, the processor 152 may manage various resources and processes within the platform 100 and may execute software instructions as well to perform applications such as network video streaming. The processor 152 may interface with the chipset 153 to transfer data to the memory 155, the I/O devices 180, and the network devices 190.

The chipset 153 may comprise one or more integrated circuits or chips that may couple the processor 152, the memory 155, the I/O devices 190 and the video processing block 158. In one embodiment, the chipset 153 may comprise controller hubs such as an I/O controller hub to support transfer of data units and control units between the processor 152 and the I/O devices 180 and the network interfaces 190. The memory 155 may store data and/or software instructions and may comprise memory devices such as DRAM (Dynamic Random Access Memory) devices, SDRAM (Synchronous DRAM) devices, DDR (Double Data Rate) SDRAM devices, or other volatile and/or non-volatile memory devices.

In one embodiment, the video processing block 158 may be provisioned within the platform block 150. In one embodiment, the video processing block 158 may be offloaded to the platform block 150 and the video processing block 158 may directly receive the transmission power consumption/bit (TPC) values from the network interfaces 190. In one embodiment, such an approach may avoid the TPC values to be provided to the OS 120. In one embodiment, the video processing block 158 may receive the video data frames or units from the applications block 110 and may compress the video data frames to generate compressed frames before transmitting the compressed frames over one of the network interfaces 190.

In one embodiment, the video processing block 158 may consume power (referred to as 'total compression power consumption' TCPC hereafter) to generate compressed frames from the video data frames. In one embodiment, the compression power consumption/bit (CPC) may vary based on the compression ratio (r) and the coder-decoder (codec) used by the video processing block 158. In one embodiment, the compression ratio (r) may be defined as a ratio of pixels to bits, which may indicate the number of pixels that can be compressed or encoded into a bit. Also, the network interfaces 190 may consume power to transmit (referred to as 'total transmission power consumption' TTPC hereafter) the compressed frames. In one embodiment, the transmission power consumption/bit TPC may be defined in terms of power consumed in transmitting a bit of data. In one embodiment, the transmission power consumption/bit TPC may be determined based on average transmission power consumption/bit. In one embodiment, the TPC may vary based on the network interface 190 selected for transmitting the compressed frames.

In one embodiment, the video processing block 158 may determine the compression ratio (r) and the network interface 190 over which the compressed frames may be transmitted. In one embodiment, the video processing block 158 may select the compression ratio (r) such that a specified quality of service (QoS) may also be satisfied. In one embodiment, the maximum allowable compression ratio (r) may be limited by the QoS value. In one embodiment, if the value of 'r' is increased beyond the specified QoS value, the quality of video data frames may deteriorate due to loss of video data. In one embodiment, the video processing block 158 may determine the optimal value of the total power consumed by the computer system 100 based on the total compression power consumption (TCPC) for a selected 'r' and the total transmission power consumption (TTPC) for a selected network interface 190.

For example, the transmission power consumption/bit of a Wi-Fi based network interface 190-A may be less than that of the Bluetooth® based network interface 190-K. In one embodiment, the compression power consumption/bit and the transmission power consumption/bit may be inversely proportional and considering one of the power consumption values (either CPC or TPC) alone may cause the computer system 100 to consume a non-optimal total power.

Figure 2:
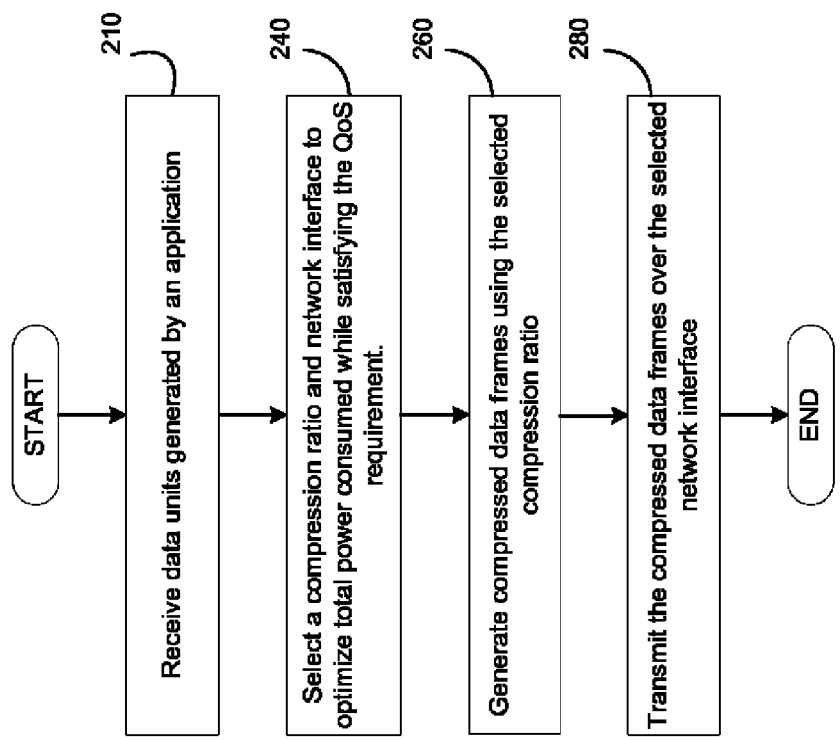
FIG. 2 is a flow-chart illustrating a technique to conserve power in a computer system 100 according to one embodiment.

An embodiment of the computer system 100, which may select an optimal total power based on the total compression power consumption (TCPC) and total transmission power consumption (TTPC) according to one embodiment is illustrated in FIG. 2.

In block 210, the platform block 150 may receive the data units generated by an application. In one embodiment, the video processing block 158 may receive video data units generated by a network video streaming application of the applications block 110, for example.

In block 240, the video processing block 158 may select a compression ratio and a network interface to optimize total power consumed by the computer system 100 while satisfying the QoS requirement. In one embodiment, the video processing block 158 may select the compression ratio based on the compression ratios supported by the video processing block 158. In one embodiment, the video processing block 158 may select a compression ratio from the available compression ratios based on the compression power consumption/bit (CPC) value associated with each compression ratio. In one embodiment, the selected compression ratio (r) may determine the frame size and the number of frames. In one embodiment, the video processing block 158 may select one of the network interfaces 190, which may transmit the frames at a least transmission power consumption/bit (TPC) value for the selected compression ratio (r). In one embodiment, the video processing block 158 may select an optimal total power based on both the TCPC value and the TTPC value.

In block 260, the video processing block 158 may generate compressed frames using the selected compression ratio. In one embodiment, the video processing block 158 may use codecs, which may support compression techniques based on H.263, MPEG-4, windows media video (WMV), and such other standards. In one embodiment, the video processing block 158 may use lossy data compression algorithms to provide effective reduction in data volume due to compression. However, the maximum compression ratio may be limited by the QoS value.

In block 280, the video compression block 158 may select a network interface 190, which may transmit the compressed frames at transmission power consumption/bit (TPC) value associated with the network interface 190.

A table 300, which illustrates relation between various example parameters that are considered while conserving power according to one embodiment. In one embodiment, the table 300 may comprise six columns 311-316 and three rows 310-330. Row 310 comprises parameters compression ratio (r) 301, processing involved (PI) 302, frame size (FS) 303, Quantity of frames (QF) 304, compression power consumption/bit (CPC) 305, and transmission power consumption/bit (TPC) 306. Column 311 comprises two levels of compression ratio (r) 301, a low compression ratio and a high compression ratio. In one embodiment, the compression ratio (r) 301 may be a function of pixels/bit, color depth, and such other similar parameters.

In one embodiment, the entries in the row 320 indicate the level of the parameters PI 302, FS 303, QF 304, CPC 305, and TPC 306 while the compression ratio (r) 301 is LOW. In one embodiment, if the compression ratio (r) 301 is LOW, the level of parameters PI 302, FS 303, QF 304, CPC 305, and TPC 306 may equal 'LOW', 'LARGE', 'MORE', 'LOW', and 'HIGH', respectively. In one embodiment, if the compression ratio (r) 301 is LOW, the processing involved PI 302 to compress the data frames and the compression power consumption/bit PC 305 may also be LOW.

Also, if the compression ratio (r) 301 is LOW, the frame size FS 303 may be LARGE as the reduction in the quantity of data due to compression is less. Also, the quantity of frames QF 304 may also be MORE as the reduction in the data volume caused due to low compression rate (r) 301 is also less. For example, if video data comprises 5000 pixels and if the compression ratio (r) 301 is 2 pixels/bit (i.e., 'r' is LOW), the processing involved PI 302 and the compression power consumption/bit CPC 305 required to compress 2 pixels into a one bit of data is also LOW. However, the compressed data with a compression ratio (r) 301 of 2 pixels/bit may comprise 2500 bits and the size of each frame (i.e., frame size FS 303) may be LARGE and the number of such frames (i.e., quantity of frames QF 304) may be MORE. In one embodiment, the transmission power consumption/bit TPC 306 required to transmit more frames of larger size may be HIGH.

In one embodiment, the entries in the row 330 indicate the level of the parameters PI 302, FS 303, QF 304, CPC 305, and TPC 306 while the compression ratio (r) 301 is HIGH. In one embodiment, if the compression ratio (r) 301 is HIGH, the level of parameters PI 302, FS 303, QF 304, CPC 305, and TPC 306 may equal 'HIGH', 'SMALL', 'LESS', 'HIGH', and 'LOW', respectively. In one embodiment, if the compression ratio (r) 301 is HIGH, the processing involved PI 302 to compress the data frames and the compression power consumption/bit CPC 305 may also be HIGH.

Also, if the compression ratio (r) 301 is HIGH, the frame size FS 303 may be SMALL as the reduction in the quantity of data due to compression is more. Also, the quantity of frames QF 304 may also be LESS as the reduction in the data volume caused due to low compression ratio (r) 301 is also more. For example, if video data comprises 5000 pixels and if the compression ratio (r) 301 is 10 pixels/bit (i.e., compression ratio is HIGH), the processing involved PI 302 and the compression power consumption/bit CPC 305 required to compress 10 pixels into a one bit of data is also HIGH. However, the compressed data with a compression ratio (r) 301 of 10 pixels/bit may comprise 500 bits and the size of each frame (i.e., frame size FS 303) may be SMALL and the number of such frames (i.e., quantity of frames QF 304) may be LESS. In one embodiment, the transmission power consumption/bit TPC 306 required to transmit less frames of smaller size may be LOW.

Figures 3, 4:
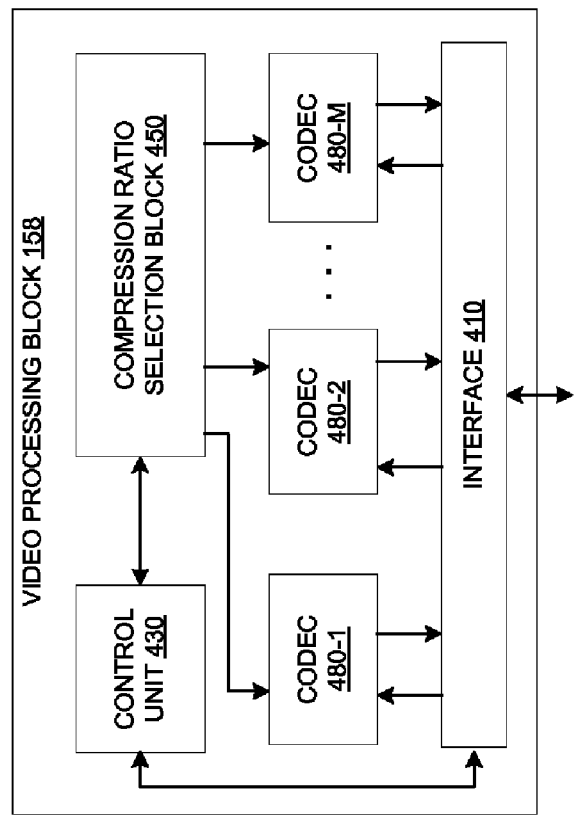
FIG. 3 depicts a table 300, which illustrates a relation between various parameters that are considered while conserving power according to one embodiment.
FIG. 4 illustrates a video processing block, which may support a technique to conserve power in a computer system 100 supporting network interfaces according to one embodiment.

An embodiment of a video processing block 158, which may support techniques to conserve power in a computer system 100 is illustrated in FIG. 4. In one embodiment, the video processing block 158 may comprise an interface 410, a control unit 430, a compression ration selection block 450, and one or more codecs 480-1 to 480-M.

In one embodiment, the interface 410 may couple the video processing block 158 with the network interfaces 190 and the chipset 153. In one embodiment, the interface 410 may support protocol conversion, electrical and physical coupling to enable the video processing block 158 to be coupled to the network interfaces 190 and the chipset 153. In one embodiment, the interface 410 may receive transmission power consumption/bit (TPC) values from the network interfaces 190 and may send the TPC values to the control unit 430.

In one embodiment, the interface 410 may receive data units such as video data frames generated by the applications block 110 and may send a codec_query signal to the control unit 430. In one embodiment, the interface 410 may receive an identifier of the codec 480 and may transfer the data units such as the video data frames to the codec 480 specified by the control unit 430. In one embodiment, the interface 410 may receive compressed frames comprising a stream of bits from one of the codec 480. In one embodiment, the interface 410 may receive an identifier of the network interface 190 over which the bits may be transmitted and the interface 410 may send the stream of bits to the network interface 190 identified by the identifier.

In one embodiment, the control unit 430 may receive the TPC values from the network interfaces 190 and may store the TPC values for each network interface 190 in a scratch pad memory within the control unit 430. For example, the control unit 430 may receive transmission power consumption/bit values (TPC_190A, TPC_190B, . . . TPC_190M) for the network interfaces 190-A, 190-B, . . . 190-M, respectively. In one embodiment, the TPC_190A may represent the transmission power consumed per bit while transferring the bit over the network interface 190-A. In one embodiment, the control unit 430 may receive a bits_signal comprising the number of bits (Z) in the compressed data. In one embodiment, the value of Z may equal (T/r), wherein 'T' may represent the total pixels in the video data frame and 'r' is the compression ratio. In other embodiment, the control unit 430 may compute the value of Z using the total pixels in the video data frames and the compression ratio (r) value received from the compression ratio selection block 450.

In one embodiment, the control unit 430 may compute the total transmission power consumption (TTPC) value required for transmitting the Z bits on each of the network interface 190-A to 190-K. In one embodiment, the transmission power required to transmit Z bits on the network interfaces 190-A, 190-B, and 190-K may be given by Equations (1), (2), and (3), respectively, below $$(TTPC) \text{ of } 190\text{-}A = (Z \times TPC\_190A) \quad \text{Equation (1)}$$

$$(TTPC) \text{ of } 190\text{-}B = (Z \times TPC\_190B) \quad \text{Equation (2)}$$

$$(TTPC) \text{ of } 190\text{-}K = (Z \times TPC\_190K) \quad \text{Equation (3)}$$

In one embodiment, the control unit 430 may select one of the network interfaces 190 based on the total transmission power consumption (TTPC) values computed for transmitting Z (=T/r) bits.

In one embodiment, the control unit 430 may receive the codec_query signal from the interface 410 and may generate a control signal to the compression ratio selection block 450. In response, the control unit 430 may receive compression ratio (r) and an identifier of the codec 480, which may be selected for generating compressed frames. In one embodiment, the control unit 430 may provide the identifier of the codec 480 to the interface 410. In one embodiment, the control unit 430 may generate an initiation signal to the codec 480 for generating compressed frames based on the identifier of the selected codec 480. In one embodiment, the control unit 430 may provide the identifier of the network interface 190 to the interface 410 in response to receiving a compression completion signal from the codec 480.

In one embodiment, the compression ratio selection block 450 may select one of the codecs 480 for performing the compression and may generate a compression ratio (r) in response to receiving the control signal from the control unit 430. In one embodiment, for a given total number of pixels 'T' in the video data frames, the compression ratio selection block 450 may select one of the compression ratios such as 2 pixels/bit, or 4 pixels/bit, or 10 pixels/bit. In one embodiment, for a higher compression ratio, the complexity of the technique used to perform compression may increase to enable encoding of more information or pixels into a single bit. In one embodiment, the compression power consumption (CPC) for compressing one pixel with a specific compression ratio (r) may be denoted as CPC (r). In one embodiment, CPC (r) may be a monotonous increasing function of 'r'. In one embodiment, CPC(r) as a function of 'r' may be linear and may be represented by Equation (4) below.

$$CPC(r) = r \times CPC \qquad \text{Equation (4)}$$

In one embodiment, the total compression power consumption (TCPC) to compress 'T' pixels may be given by Equation (5) below.

$$TCPC = (T \times r \times CPC) \qquad \text{Equation (5)}$$

In one embodiment, from Equation (5), it may be concluded that the total compression power consumption (TCPC) to compress 'T' pixels may increase with an increase in the value of compression ratio (r).

In one embodiment, the compression ratio selection block 450 may compute the optimal value of compression ratio (r_optimal). In one embodiment, the r_optimal may be determined from the equations below. In one embodiment, the total power consumption (tot_power) of the computer system 100 using the network interface 190-A, for example, may be provided by the Equation (6) below.

$$tot\_power = TCPC + TTPC = (T \times r \times CPC) + (TPC\_190A \times Z) \qquad \text{Equation (6)}$$

In one embodiment, the compression ratio selection block 450 may compute r_optimal, which may minimize the total power consumption (tot_power) by differentiating the Equation (6). In one embodiment, the value of r_optimal may be given by the Equation (7) below.

$$r\_optimal = \text{square root of}(TPC\_190A/CPC) \qquad \text{Equation (7)}$$

In one embodiment, the compression ratio selection block 450 may comprise a dedicated hardware component to determine the value of r_optimal. In other embodiments, the compression ratio selection block 450 may comprise a software component to determine the value of r_optimal. In yet other embodiment, the compression ratio selection block 450 may comprise a combination of hardware and software components to determine the value of r_optimal.

In one embodiment, the compression ratio selection block 450 may select a higher compression ratio if the transmission cost is high to optimize the total power consumed. However, the upper limit of optimal compression ratio (r_optimal) may be based on the allowable QoS limit.

In one embodiment, the codecs 480-1, 480-2, and 480-M may generate compressed frames using the video data frames received from the interface 410 and the optimal compression ratio (r_optimal) value received from the compression ratio selection block 450. In one embodiment, the codec 480-M may be selected to generate compressed frames and the codec 480-M may generate compressed frames using the video data frames and the optimal compression ratio (r_optimal) value after receiving the initiation signal from the control unit 430. In one embodiment, the codec 480-M may provide the compressed frames to the interface 410 and may send a compression completion signal to the control unit 430. In one embodiment, the codecs 480 may include software and hardware implemented codecs.

FIG. 5 is a graph 500, which depicts relation between compression ratio (r) 301 and the processing involved (PI 302) according to one embodiment. In one embodiment, the graph 500 may comprise r 301 plotted along X-axis and PI 302 plotted along Y-axis. In one embodiment, the plot 550 may represent a linear relation between the compression ratio r 301 and the processing involved PI 302. In one embodiment, as compression ratio r 301 increases, the processing involved PI 302 to perform compression also increases.

A graph 600, which depicts relation between compression ratio (r) 301 and the frame size FS 303 is illustrated in FIG. 6. In one embodiment, the graph 600 may comprise r 301 plotted along X-axis and FS 303 plotted along Y-axis. In one embodiment, the plot 650 may represent an inversely linear relation between the compression ratio r 301 and the frame size 303 FS 303. In one embodiment, as compression ratio r 301 increases, the size of the frames denoted by FS 303 may decrease.

A graph 700, which depicts relation between compression ratio r 301 and transmission power consumption/bit (TPC) for one or more network interfaces (NI) 190 is illustrated in FIG. 7. In one embodiment, the graph 700 may comprise r 301 plotted along X-axis and TPC 306 plotted along Y-axis. In one embodiment, the plots 730, 740, and 750 may represent an inversely proportional relation between the compression ratio r 301 and the transmission power consumed by the network interface 190-A, 190-B, and 190-, respectively.

A graph 800, which depicts the relation between compression ratio r 301 and the compression power consumption/bit CPC 305 is illustrated in FIG. 8. In one embodiment, the graph 800 may comprise r 301 plotted along X-axis and CPC 305 plotted along Y-axis. In one embodiment, the plot 850 may represent a linear relation between the compression ratio r 301 and the compression power consumption CPC 305. In one embodiment, as compression ratio r 301 increases, the compression power consumption CPC 305 to perform compression also increases.

In one embodiment, the graph 800 also depicts a straight line QoS 830, which is perpendicular to the X-axis and intercepts the X-axis at a point 810. In one embodiment, the point 810 may represent a maximum value of compression ratio, which may satisfy the quality of service. In one embodiment, a value of compression ratio in the area A320, which is to the left of the line QoS 830 may satisfy the QoS and a value of compression ratio in the area A340 that is to the right of the line QoS 830 may not satisfy the QoS.

A graph 900, which depicts the relation between compression ratio r 301 and the total power (tot_power) consumed by the computer system 100 is illustrated in FIG. 9. In one embodiment, the graph 900 may comprise r 301 plotted along X-axis and tot_power 910 plotted along Y-axis. In one embodiment, the plot 930 may represent a relation between the compression ratio r 301 and the total power consumed by the network interface 190-A. In one embodiment, the total power (tot_power 910) may decrease until a certain point 935 with the increase in the compression ratio r 301.

In one embodiment, the decrease in the tot_power 910 may be attributed to an exponential decrease in the TPC 306 and a linear increase in the CPC 305. However, as the compression ratio r 301 increases beyond the point 935, the rate of decrease in TPC 306 may tend to zero and the CPC 305 may continue to increase linearly causing the tot_power 910 to increase beyond the point 935. In one embodiment, the point 935 at which the tot_power 910 is minimal may be referred to as optimal value of r 301. Also, as the r_optimal 935 is within the OoS 830, the optimal value of r 301 (r_optimal 935) may satisfy the QoS requirement.

Similarly, the plot 940 depicts an initial decrease in the total power consumed by the computer system 100 until the compression ratio r 301 increases to a certain point 945. An increase in the compression ratio r 301 beyond a point 945 (r_optimal 945), while using the network interface 190-B, may cause the total power (tot_power 910) to increase. In one embodiment, the plot 950 depicts an initial decrease in the total power consumed by the computer system 100 until the compression ratio r 301 increases to a certain point 956. An increase in the compression ratio r 301 beyond a point 956, while using the network interface 190-M, may cause the total power (tot_power 910) to increase. However, the point 956 may not satisfy the QoS requirement and a point 954 on the plot 950 may be selected as r_optimal, which may satisfy the QoS requirement.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method to conserve power in a computer platform comprising:
   receiving a plurality of frames from an application,
   determining an optimal compression ratio in a processing block of the computer platform, wherein the optimal compression ratio is to cause a minimum of a total power to be consumed by the computer platform, wherein the total power consumed by the computer platform includes a total compression power consumption value and a total transmission consumption value,
   generating compressed frames using the processing block, wherein the compressed frames are generated by encoding the plurality of frames using the optimal compression ratio, and
   transmitting the compressed frames over a first network interface, wherein the first network interface is selected from a plurality of network interfaces.

2. The method of claim 1, wherein the total compression power consumption value is a power consumed to generate the compressed frames from the plurality of frames using the optimal compression ratio.

3. The method of claim 2, wherein the total compression power consumption value is based on a power consumed for encoding a bit and a total content of the plurality of frames.

4. The method of claim 2 further comprises selecting a codec to generate the compressed frames, wherein the codec is to support a plurality of compression ratios including the optimal compression ratio.

5. The method of claim 1, wherein the optimal compression ratio is selected to satisfy a quality of service value.

6. The method of claim 1, wherein the total transmission power consumption value is a power consumed by the first network interface to transmit the compressed frames.

7. The method of claim 6, wherein the total transmission power consumption value is based on a power consumed to transmit a bit of the compressed frames and a total number of bits in the compressed frames.

8. The method of claim 7, wherein the power consumed by the first network interface to transmit the compressed frames is less than the power consumed by a second network interface of a plurality of network frames to transmit the compressed frames.

9. An apparatus to conserve power in a computer platform comprises:
   an interface, wherein the interface is to receive a plurality of frames from an application,
   a control block coupled to the interface, wherein the control block is to generate a control signal and an initiation signal,
   a compression ratio selection block coupled to control block, wherein the compression ratio selection block is to determine an optimal compression ratio in response to receiving the control signal,
   wherein the optimal compression ratio is selected to cause a minimum of a total power to be consumed by the computer platform, wherein the total power consumed by the computer platform is to include a total compression power consumption value and a total transmission consumption value, and
   a codec coupled to the interface and the control block, wherein the codec is to generate compressed frames in response to receiving the initiation signal, wherein the codec is to generate the compressed frames by encoding the plurality of frames using the optimal compression ratio.

10. The apparatus of claim 9, wherein the power consumed by the codec to generate the compressed frames from the plurality of frames using the optimal compression ratio is the total compression power consumption value, wherein the codec is to transfer the compressed frames to the interface.

11. The apparatus of claim 10, wherein the total compression power consumption value is based on a power consumed by the codec for encoding a bit and a total content of the plurality of frames.

12. The apparatus of claim 10, wherein the compression ratio selection block is to select the codec to generate the compressed frames, wherein the codec is to support a plurality of compression ratios including the optimal compression ratio.

13. The apparatus of claim 10, wherein the compression ratio selection block is to select the optimal compression ratio to satisfy a quality of service value.

14. The apparatus of claim 9, wherein the control block is to select a first network interface from a plurality of network interfaces, wherein the total transmission power consumption value is a power consumed by the first network interface to transmit the compressed frames received from the interface.

15. The apparatus of claim 14, wherein the total transmission power consumption value is based on a power consumed to transmit a bit of the compressed frames and a total number of bits in the compressed frames.

16. The apparatus of claim 15, wherein the power consumed by the first network interface to transmit the compressed frames is less than the power consumed by a second network interface of the plurality of network interfaces to transmit the compressed frames.

17. A system comprising:
an application block, wherein the application block is to generate a plurality of frames,
an operating system is to support the application block, and
a computer platform coupled to the operating system and a plurality of network interfaces, wherein the computer platform further comprises a processing block, wherein the processing block is to,
determine an optimal compression ratio in response to receiving a control signal, wherein the optimal compression ratio is selected to cause a minimum of a total power to be consumed by the computer platform, wherein the total power consumed by the computer platform is to include a total compression power consumption value and a total transmission consumption value,
generate compressed frames by encoding the plurality of frames using the optimal compression ratio, and
select a first network interface from the plurality of network interfaces to transmit the compressed frames.

18. The system of claim 17 the processing block further comprises a codec to generate the compressed frames, wherein the power consumed by the codec to generate the compressed frames using the optimal compression ratio is the total compression power consumption value.

19. The system of claim 18, wherein the total compression power consumption value is based on a power consumed by the codec for encoding a bit and a total content of the plurality of frames.

20. The system of claim 18 the processing block further comprises a compression ratio selection block, wherein the compression ratio selection block is to select the codec to generate the compressed frames, wherein the codec is to support a plurality of compression ratios including the optimal compression ratio.

21. The system of claim 18, wherein the compression ratio selection block is to select the optimal compression ratio to satisfy a quality of service value.

22. The system of claim 17 the processing block further comprises a control block, wherein the control block is to select a first network interface from a plurality of network interfaces, wherein the total transmission power consumption value is a power consumed by the first network interface to transmit the compressed frames.

23. The system of claim 22, wherein the total transmission power consumption value is based on a power consumed to transmit a bit of the compressed frames and a total number of bits in the compressed frames.

24. The system of claim 23, wherein the power consumed by the first network interface to transmit the compressed frames is less than the power consumed by a second network interface of the plurality of network interfaces to transmit the compressed frames, wherein the first network interface is Wi_Fi technology based network interface and the second network interface is a Bluetooth based network interface.

25. The system of claim 17, wherein the system is resource constrained device and the plurality of frames comprise video data of a network video streaming application.

* * * * *